United States Patent
Niwa et al.

(10) Patent No.: US 8,164,325 B2
(45) Date of Patent: Apr. 24, 2012

(54) DISPLACEMENT SENSOR

(75) Inventors: Masahisa Niwa, Suita (JP); Yukiko Nishida, Osaka (JP); Kunitaka Okada, Hirakata (JP)

(73) Assignee: Panasonic Corporation, Osaka (JP)

( * ) Notice: Subject to any disclaimer, the term of this patent is extended or adjusted under 35 U.S.C. 154(b) by 493 days.

(21) Appl. No.: 12/120,411

(22) Filed: May 14, 2008

(65) Prior Publication Data

US 2008/0290861 A1 Nov. 27, 2008

(30) Foreign Application Priority Data

May 25, 2007 (JP) ............................. P2007-139607

(51) Int. Cl.
G01B 7/00 (2006.01)
G01B 7/14 (2006.01)

(52) U.S. Cl. .................. 324/207.12; 324/207.16
(58) Field of Classification Search . 324/207.11–207.19
See application file for complete search history.

(56) References Cited

U.S. PATENT DOCUMENTS

| | | | |
|---|---|---|---|
| 5,003,258 A * | 3/1991 | Mancini | 324/207.12 |
| 5,216,364 A * | 6/1993 | Ko et al. | 324/207.24 |
| 6,052,036 A | 4/2000 | Enströom et al. | |
| 6,191,575 B1 * | 2/2001 | Mednikov et al. | 324/207.16 |
| 6,580,264 B2 * | 6/2003 | Nekado | 324/207.16 |
| 6,768,956 B2 * | 7/2004 | Hayashi | 702/91 |
| 6,909,279 B2 * | 6/2005 | Niwa | 324/207.16 |
| 7,046,018 B2 * | 5/2006 | Toda et al. | 324/679 |
| 7,088,094 B2 * | 8/2006 | VunKannon, Jr. | 324/207.17 |
| 7,345,471 B2 * | 3/2008 | Sellen et al. | 324/207.12 |
| 7,511,477 B2 * | 3/2009 | Niwa | 324/207.16 |
| 7,679,361 B2 * | 3/2010 | Niwa et al. | 324/207.16 |
| 8,018,222 B2 * | 9/2011 | Karenowska et al. | 324/207.16 |
| 2004/0155714 A1 | 8/2004 | Nishikawa et al. | |
| 2005/0218885 A1 * | 10/2005 | Kozaki | 324/207.11 |
| 2006/0280511 A1 | 12/2006 | Futami | |
| 2007/0273393 A1 | 11/2007 | Furukubo et al. | |
| 2008/0025582 A1 | 1/2008 | Kobayashi | |
| 2008/0053224 A1 | 3/2008 | Tsuji et al. | |
| 2008/0156095 A1 | 7/2008 | Tsuji et al. | |

FOREIGN PATENT DOCUMENTS

CN 1277752 12/2000
(Continued)

OTHER PUBLICATIONS

English language Abstract of JP 5-40002, Feb. 19, 1993.
(Continued)

*Primary Examiner* — Huy Q Phan
*Assistant Examiner* — Joshua Benitez
(74) *Attorney, Agent, or Firm* — Greenblum & Bernstein, P.L.C.

(57) ABSTRACT

An oscillator circuit outputs an oscillator signal with a frequency corresponding to an inductance of a displacement detector coil. An oscillation cycle measurement circuit measures a cycle of the oscillator signal output from the oscillator circuit, and outputs a signal corresponding to the measured cycle. A squaring circuit calculates and outputs a square of the signal output from the oscillation cycle measurement circuit. By the calculation and output of the square of the oscillator signal cycle, a square root component of the product of inductance and capacitance components is eliminated, so that the output signal changes linearly relative to the displacement of a displacement body. As a result, the linearity of the output signal relative to the displacement of the displacement body can be improved.

13 Claims, 4 Drawing Sheets

FOREIGN PATENT DOCUMENTS

| | | |
|---|---|---|
| CN | 1534863 | 10/2004 |
| JP | 56-46402 | 4/1981 |
| JP | 58-6212 | 1/1983 |
| JP | 5-40002 | 2/1993 |
| JP | 2004-69415 | 3/2004 |
| JP | 2006-047194 | 2/2006 |
| JP | 2006-47194 | 2/2006 |
| JP | 2006-317284 | 11/2006 |
| JP | 2006-352360 | 12/2006 |

OTHER PUBLICATIONS

English language Abstract of JP 2006-047194, Feb. 16, 2006.
English language Abstract of JP 2004-69415, Mar. 4, 2004.
English language Abstract of JP 56-46402, Apr. 27, 1981.
English language Abstract of JP 2006-317284, Nov. 24, 2006.
English language Abstract of JP 58/6212, Jan. 14, 1983.
China Office action, dated Jan. 6, 2011 along with an english translation thereof.

* cited by examiner

DISPLACEMENT SENSOR

CROSS REFERENCE TO RELATED APPLICATION

This application is based upon and claims the benefit of priority from a Japanese Patent Application No. TOKUGAN 2007-139607, filed on May 25, 2007; the entire contents of which are incorporated herein by reference.

BACKGROUND OF THE INVENTION

1. Field of the Invention

The present invention relates to a displacement sensor that detects displacement of a displacement body by detecting inductance change of a displacement detector coil that is caused by the displacement of the displacement body.

2. Description of the Related Art

A displacement detecting apparatus has been known which includes a displacement detector coil and a displacement body, and which is designed so that the displacement body is freely displaced relative to the displacement detector coil so as to cause a magnetic change of this displacement detector coil, as disclosed in Japanese Unexamined Patent Application Publication No. 05-040002. This displacement detecting apparatus generates an oscillator signal with a frequency corresponding to an inductance of the displacement detector coil, and outputs an output signal corresponding to a cycle of the oscillator signal, thereby detecting the displacement of the displacement detector coil as the inductance change of the displacement detector coil.

In this displacement detecting apparatus, the cycle of the oscillator signal is expressed by $2\pi(LC)^{1/2}$, and therefore the output signal contains a square root component of the product of an inductance (L) component and a capacitance (C) component. According to this displacement detecting apparatus, even when the displacement of the displacement body and the inductance change of the displacement detector coil have a linear relationship, the output signal changes nonlinearly relative to the displacement of the displacement body, which makes it inconvenient to use the output signal.

The present invention has been made to solve this problem, and an object thereof is to provide a displacement sensor that has improved the linearity of the output signal relative to the displacement of the displacement body.

SUMMARY OF THE INVENTION

The displacement sensor according to the present invention includes: a cylindrical displacement detector coil; an electric conductor that is disposed close to inside or outside of the displacement detector coil in a radial direction thereof and that is freely displaced in an axial direction of the displacement detector coil; an oscillator circuit that outputs an oscillator signal with a frequency corresponding to an inductance of the displacement detector coil; an oscillation cycle measurement circuit that outputs a signal corresponding to a cycle of the oscillator signal output from the oscillator circuit; and a square output unit that calculates and outputs a square of the signal output from the oscillation cycle measurement circuit.

According to the displacement sensor in the present invention, the square of the signal that corresponds to a cycle of the oscillator signal with a frequency corresponding to an inductance of the displacement detector coil is calculated and output, so that the output signal changes linearly relative to the displacement of the displacement body, which facilitates the use of the output signal.

BRIEF DESCRIPTION OF THE DRAWINGS

Examples of the invention will become more fully apparent from the following description and appended claims, taken in conjunction with the accompanying drawings. Understanding that these drawings depict only examples and are, therefore, not to be considered limiting of the invention's scope, the examples of the invention will be described with additional specificity and detail through use of the accompanying drawings in which:

DETAILED DESCRIPTION OF THE PREFERRED EMBODIMENTS

Figure 1:
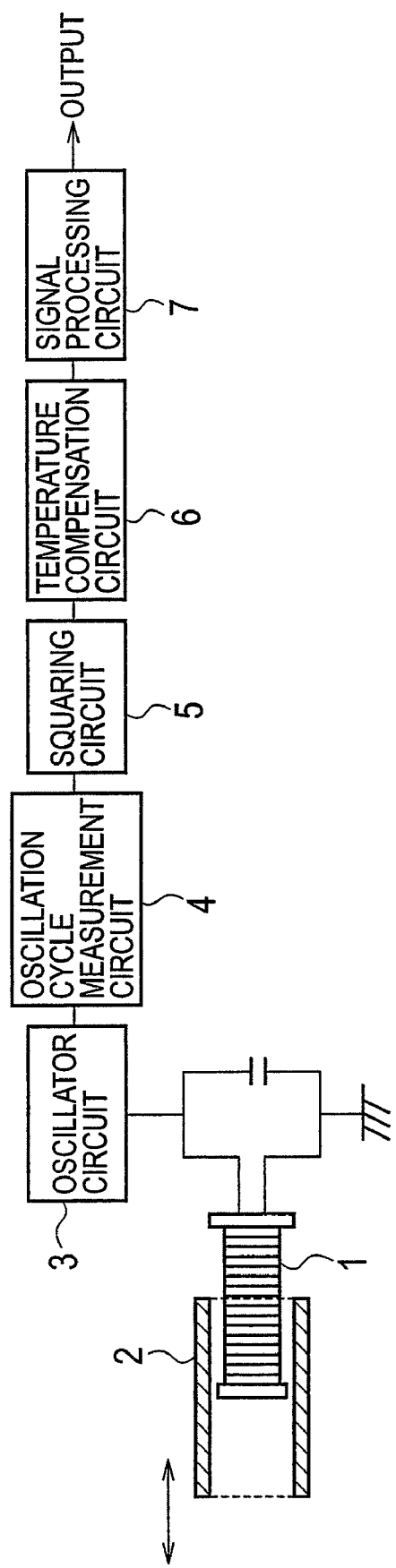
FIG. 1 is a block diagram showing a structure of a displacement sensor according to an embodiment of the present invention.

By referring to the drawings, a structure of a displacement sensor and a displacement detecting operation thereof will be described below according to an embodiment of the present invention.

(Structure of Displacement Sensor)

The displacement sensor according to the embodiment of the present invention mainly includes, as shown in FIG. 1, a displacement detector coil 1, an electric conductor 2, an oscillator circuit 3, an oscillation cycle measurement circuit 4, a squaring circuit 5, a temperature compensation circuit 6, and a signal processing circuit 7. In this embodiment, the oscillation cycle measurement circuit 4, the squaring circuit 5, the temperature compensation circuit 6, and the signal processing circuit 7 each are made up of hardware circuit components, but can also be configured on a software basis by causing a processor such as a microcomputer to execute a computer program describing functions of each circuit.

Figure 2:
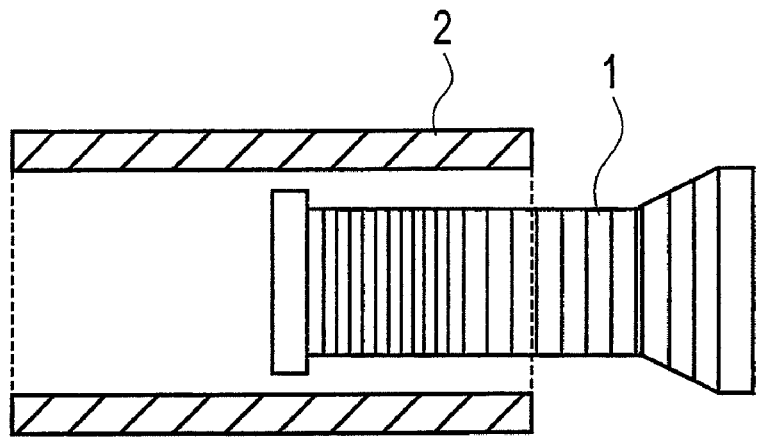
FIG. 2 is a schematic diagram showing a structure of the displacement sensor of FIG. 1 in an application example thereof.

The displacement detector coil 1 has a cylindrical shape whose axial length is longer than an outer diameter, in order to secure the linearity of inductance change relative to the displacement of the electric conductor 2. The winding density of the displacement detector coil 1 is uniform in an axial direction thereof in this embodiment, but can also be non-uniform in the axial direction as shown in FIG. 2 in which the winding density is large on an end side of the coil. According this structure, the linearity of inductance change relative to the displacement of the electric conductor 2 can be improved further. The displacement detector coil 1 is desirably formed by winding a conductive wire onto a non-magnetic body. When the displacement detector coil 1 is formed by winding a conductive wire onto a magnetic body and an external magnetic field is applied thereto in the axial direction, a magnetic flux of the external magnetic field passes mainly through the magnetic body. When this external magnetic field is an alternating current, the magnetic flux of the external magnetic field produces induced voltage in the displacement detector coil 1, so that output fluctuates. Furthermore, when the external magnetic field is a direct current, magnetic saturation of the magnetic body occurs in the case that the external magnetic field is small or that the magnetic body is thin, so that output fluctuates. Therefore, by forming the displacement detector coil 1 by winding a conductive wire onto a non-magnetic body, the output fluctuation caused by the external magnetic field can be prevented.

Figure 3:
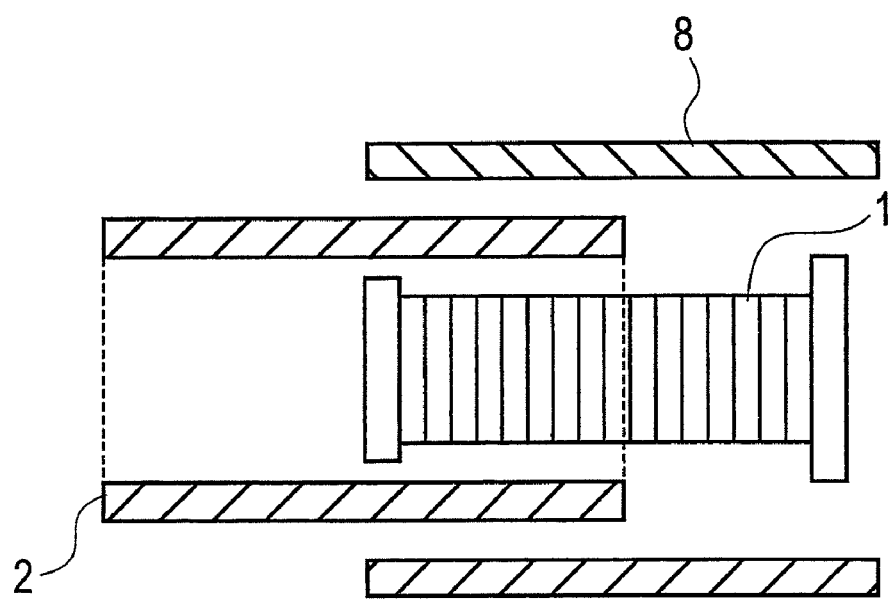
FIG. 3 is a schematic diagram showing a structure of the displacement sensor of FIG. 1 in an application example thereof.

The electric conductor 2 is made of a conductive material such as aluminum and has a cylindrical hollow shape, and is disposed close to the outside of the displacement detector coil 1 in a radial direction thereof in such a manner that the electric conductor 2 can be displaced relative to the displacement detector coil 1 in the axial direction thereof. As shown in FIG. 3, a magnetic shield 8 can be disposed outside the displacement detector coil 1 and the electric conductor 2 to shield them from electromagnetic waves. According this structure, even when the amount of insertion of the displacement detector coil 1 into the electric conductor 2 is small, an emission level can be reduced. Moreover, even when the displacement sensor is provided inside a metal hole, the sensor can be less affected by the surrounding metal. Furthermore, the electric conductor 2 is disposed close to the outside of the displacement detector coil 1 in the radial direction thereof in this embodiment, but can alternatively be disposed close to the inside of the displacement detector coil 1 in the radial direction thereof. In addition, the electric conductor 2 can be mounted to a target for measurement of the displacement amount, can be a part of the target.

The oscillator circuit 3 is a widely-known LC oscillator circuit such as a Hartley-type circuit, and outputs an oscillator signal with a frequency corresponding to an inductance of the displacement detector coil 1. The oscillator circuit 3 desirably includes an amplitude limiter circuit that limits an amplitude of the oscillator signal to a predetermined value. According to this structure, an emission level can be suppressed and power consumption of the oscillator circuit 3 can also be reduced. The oscillation cycle measurement circuit 4 measures a cycle of the oscillator signal output from the oscillator circuit 3, and outputs a signal corresponding to the measured cycle. The squaring circuit 5 calculates and outputs a square of the signal output from the oscillation cycle measurement circuit 4. The temperature compensation circuit 6 restrains temperature changes of output that are attributed to the conductivities of the conductive wire forming the displacement detector coil 1 or of the electric conductor 2. The signal processing circuit 7 calculates the displacement amount of the electric conductor 2 using an output signal from the temperature compensation circuit 6.

(Displacement Detecting Operation)

The displacement sensor thus configured detects the amount of displacement of the electric conductor 2 by performing operations as described below. Specifically, the oscillator circuit 3 first outputs an oscillator signal with a frequency ($1/T_{res}$) corresponding to an inductance (L) of the displacement detector coil 1. The inductance of the displacement detector coil 1 varies depending on the amount of displacement (insertion) of the electric conductor 2 in the axial direction of the displacement detector coil 1. The oscillation cycle measurement circuit 4 then measures a cycle ($T_{res}$) of the oscillator signal output from the oscillator circuit 3, and outputs a signal corresponding to the measured cycle ($T_{res}$).

Afterwards, the squaring circuit 5 calculates and outputs a square ($T_{res}^2$) of the signal output from the oscillation cycle measurement circuit 4. Since the cycle ($T_{res}$) of the oscillator signal is expressed by $2\pi(LC)^{1/2}$, the square ($T_{res}^2$) of the signal output from the oscillation cycle measurement circuit 4 is expressed by a formula 1 indicated below. By calculation and output of the square of the oscillator signal cycle ($T_{res}$), a square root component of the product of inductance (L) and capacitance (C) components is eliminated, so that the output signal changes linearly relative to the displacement of the displacement body.

$$T_{res}^2 = (2\pi\sqrt{LC})^2 \qquad \text{(Formula 1)}$$

Figure 4:
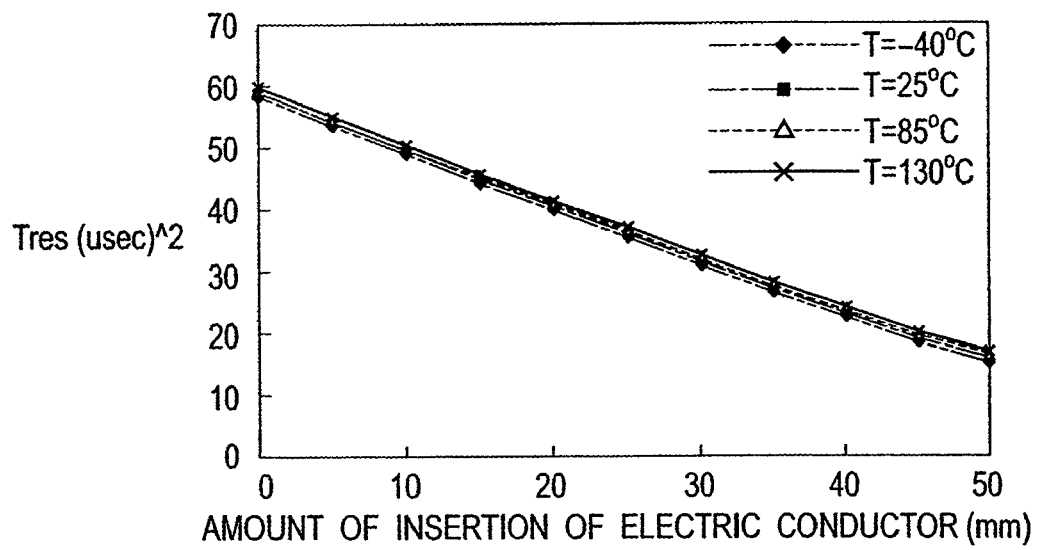
FIG. 4 is a diagram showing characteristics of change in squares relative to the amount of displacement of an electric conductor under various temperature conditions.
Figure 5:
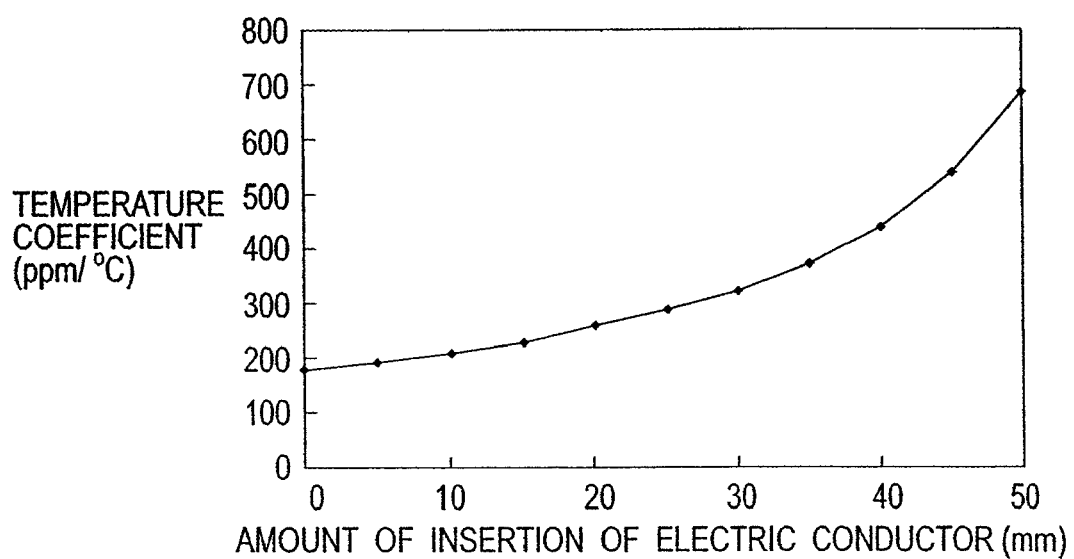
FIG. 5 is a diagram showing a change of temperature coefficients of the squares relative to the amount of displacement of the electric conductor.

Next, the temperature compensation circuit 6 compensates for temperature changes of the square ($T_{res}^2$) that are ascribable to the conductivities of the conductive wire forming the displacement detector coil 1 or of the electric conductor 2. In the displacement sensor of this embodiment, the inductance change of the displacement detector coil 1 relative to the displacement amount of the electric conductor 2 is determined when an eddy current flowing into the electric conductor 2 cancels a magnetic flux produced by the displacement detector coil 1. This eddy current becomes small with increasing temperature. Therefore, as the amount of insertion of the electric conductor 2 into the displacement detector coil 1 becomes larger, the inductance becomes smaller and a temperature coefficient becomes larger. In contrast, as the amount of insertion of the electric conductor 2 into the displacement detector coil 1 becomes smaller, the inductance becomes larger and the temperature coefficient becomes smaller. More specifically, the characteristics of the square ($T_{res}^2$) change relative to the displacement amount of the electric conductor 2 vary depending on temperature as shown in FIG. 4, and the temperature coefficient thereof changes as shown in FIG. 5. Therefore, it is difficult to simply compensate for temperature changes of the square ($T_{res}^2$).

Figure 6:
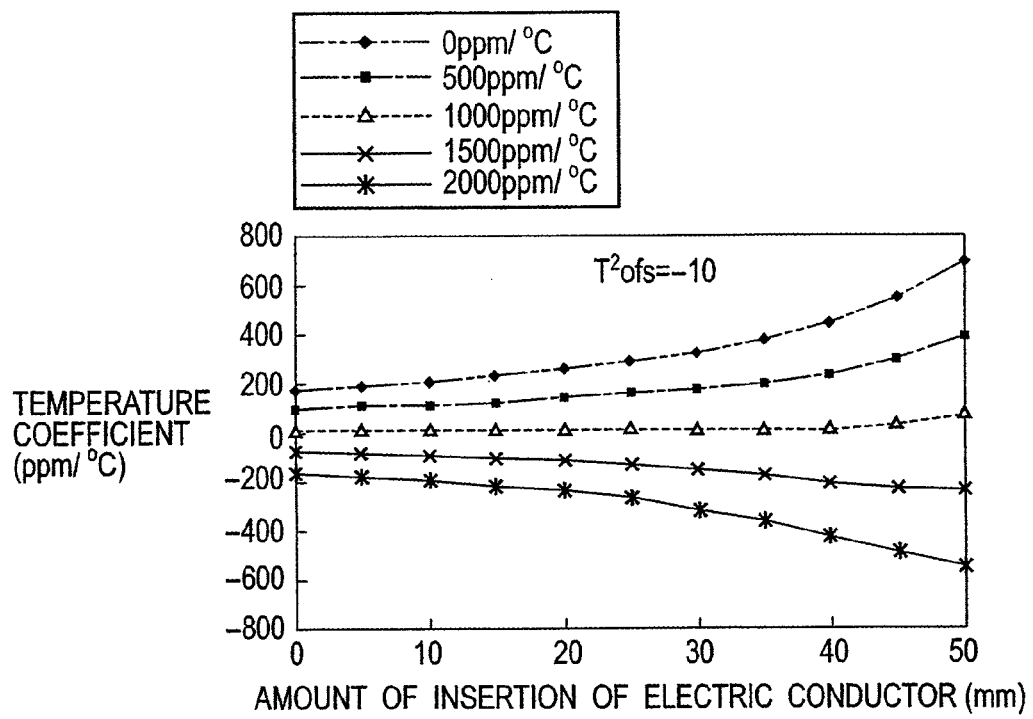
FIG. 6 is a diagram showing characteristics of a temperature coefficient change relative to the amount of displacement of the electric conductor under various temperature conditions.
Figure 7:
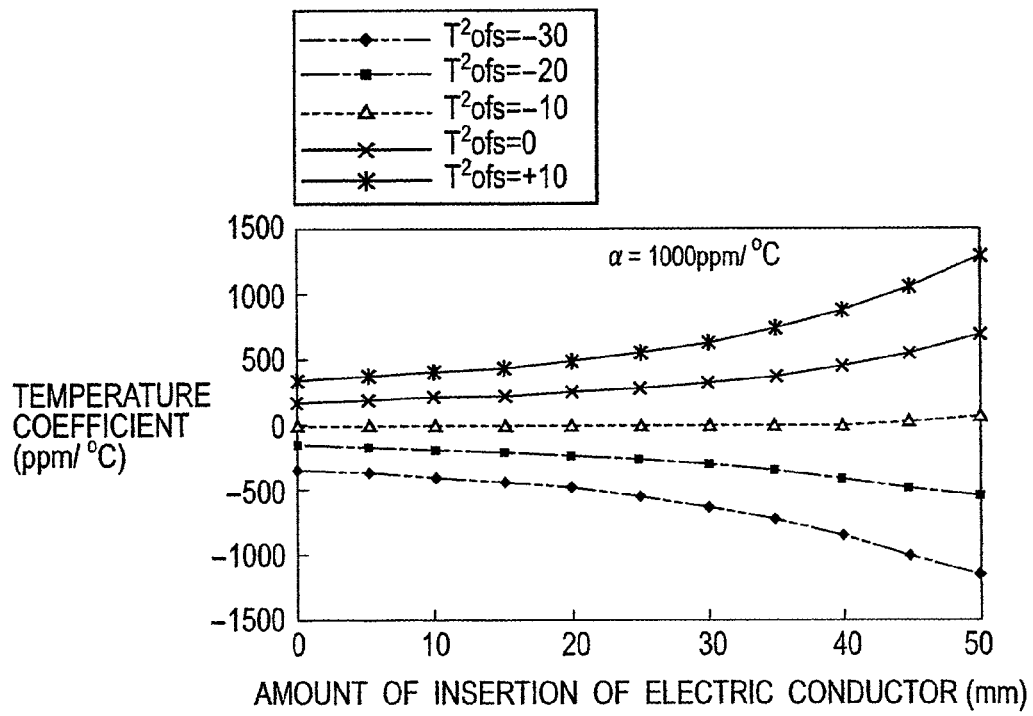
FIG. 7 is a diagram showing characteristics of the temperature coefficient change relative to the amount of displacement of the electric conductor at various offset values.

In this embodiment, the temperature compensation circuit 6 calculates and outputs a parameter P expressed by a formula 2 indicated below thereby to compensate for temperature changes of the square ($T_{res}^2$). This parameter P is obtained by adding an offset value ($T_{ofs}^2\{1+\alpha(T_a-T_o)\}$) to the square ($T_{res}^2$), where $T_{ofs}^2$ represents an offset amount, α represents a temperature coefficient, $T_a$ represents a detected temperature, and $T_o$ represents a reference temperature (25° C.). The signal processor circuit 7 finally calculates the amount of displacement of the electric conductor 2 by using the output signal of the temperature compensation circuit 6. According to this parameter P, by setting the offset amount $T_{ofs}^2$ and the temperature coefficient α to their appropriate values, the dependence of the temperature coefficient on the displacement can be reduced, as shown in FIGS. 6 and 7. In this case, it is desirable that at least one of the offset amount $T_{ofs}^2$ and the temperature coefficient α be a programmable parameter. According to this structure, it is possible to cope with difference in temperature changes attributed to the types of the displacement detector coil 1 such as shape or axial length thereof, or to the variety of products. Furthermore, it is allowable to apply a predetermined compensating temperature coefficient to chancel the temperature coefficient α. This enables compensation for the temperature changes regardless of the amount of displacement of the electric conductor 2.

$$P = T_{res}^2 + T_{ofs}^2\{+1+\alpha(Ta-To)\} \qquad \text{(Formula 2)}$$

Although the present invention made by the present inventors has been described in reference to its embodiment, the statement and drawings constituting part of the disclosure of the present invention should not be regarded as limiting the present invention. That is, various alternative embodiments, examples, and operation techniques made by those skilled in the art on the basis of the foregoing embodiment are, of course, within the scope of the present invention.

What is claimed is:

1. A displacement sensor comprising:
   a cylindrical displacement detector coil;
   an electric conductor disposed close to an inside or outside of the displacement detector coil in a radial direction thereof, the electric conductor being freely displaceable in an axial direction of the displacement detector coil;
   an oscillator that outputs an oscillation signal with a frequency corresponding to an inductance of the displacement detector coil, the inductance of the displacement detector coil linearly increasing or linearly decreasing depending on a displacement of the electric conductor from one end to the other;
   an oscillation cycle meter that outputs a signal corresponding to a cycle of the oscillation signal output from the oscillator, the signal output from the oscillation cycle meter including square root component of a product of inductance and capacitance of the displacement detector coil; and
   a square calculator that performs a mathematical squaring operation on the signal output from the oscillation cycle meter, and outputs a squared signal corresponding to a square of the signal output from the oscillation cycle meter, the mathematical squaring operation removing the square root component of a product of inductance and capacitance of the displacement detector coil, such that the squared signal output from the square calculator changes generally linearly relative to a displacement of the electric conductor.

2. The displacement sensor according to claim 1, further comprising:
   a temperature compensator that compensates for temperature change of the squared signal output from the square calculator.

3. The displacement sensor according to claim 2, wherein the temperature compensator adds an offset amount having a predetermined temperature coefficient to the squared signal output from the square calculator thereby to compensate for the temperature change of the squared signal.

4. The displacement sensor according to claim 3, wherein at least one of the temperature coefficient and the offset amount is a programmable parameter.

5. The displacement sensor according to claim 3, wherein the temperature compensator applies a compensation temperature coefficient to the squared signal to which the offset amount has been added, so as to cancel the predetermined temperature coefficient.

6. The displacement sensor according to claim 5, wherein the compensation temperature coefficient is a programmable parameter.

7. The displacement sensor according to claim 1, wherein a non-magnetic body is disposed inside the displacement detector coil.

8. The displacement sensor according to claim 1, wherein the oscillator includes an amplitude limiter that limits an amplitude of the oscillation signal to a predetermined value.

9. The displacement sensor according to claim 1, wherein a winding of the displacement detector coil is non-uniformly distributed in the axial direction.

10. The displacement sensor according to claim 1, wherein the displacement detector coil and the electric conductor are enclosed with a magnetic shield, such that the magnetic shield shields the displacement detector coil and the electric conductor from electromagnetic waves.

11. The displacement sensor according to claim 1, wherein the squared signal output from the square calculator comprises a product of inductance and capacitance of the displacement detector coil.

12. The displacement sensor according to claim 1, wherein the signal output from the oscillation signal cycle meter corresponds to $2\pi(LC)^{1/2}$, and the squared signal output from the square calculator corresponds to $(2\pi)^2 LC$, wherein L and C are the inductance and capacitance of the displacement detector coil, respectively.

13. The displacement sensor according to claim 1, wherein the square calculator performs only the mathematical squaring operation to obtain the squared signal that changes generally linearly relative to a displacement of the electric conductor.

* * * * *